June 17, 1952  E. J. PERINONI ET AL  2,600,685
FISHING REEL

Filed Oct. 3, 1949  2 SHEETS—SHEET 1

INVENTOR.
Edward J. Perinoni
Dominic Perinoni
BY
A. Schapp
ATTORNEY

June 17, 1952  E. J. PERINONI ET AL  2,600,685
FISHING REEL
Filed Oct. 3, 1949  2 SHEETS—SHEET 2
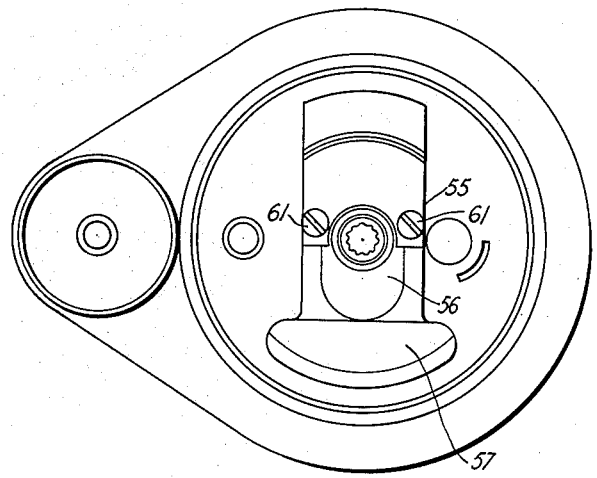
FIG_3_
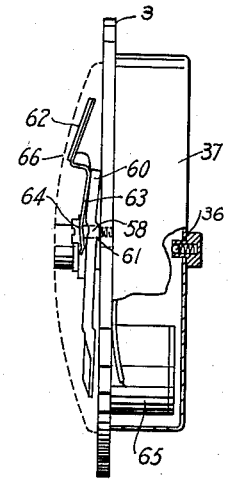
FIG_4_
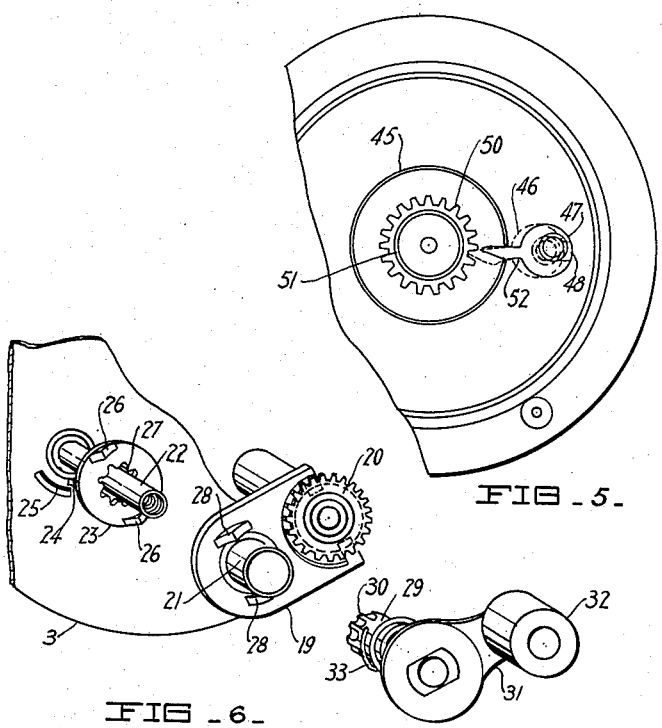
FIG_5_
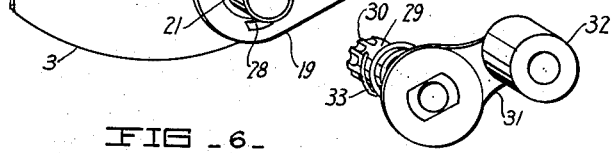
FIG_6_
INVENTOR.
Edward J. Perinoni
Dominic Perinoni
BY  A. Schapp
ATTORNEY Patented June 17, 1952

2,600,685

UNITED STATES PATENT OFFICE 2,600,685

FISHING REEL

Edward J. Perinoni, Santa Clara, and Dominic Perinoni, Los Gatos, Calif.

Application October 3, 1949, Serial No. 119,328

8 Claims. (Cl. 242—84.6)

The present invention relates to improvements in a fishing reel, and its principal object is to provide certain improvements whereby a fishing reel is rendered more efficient in operation.

More particularly the present invention contemplates certain improvements on the fishing reel described in our prior appliiation Serial Number 33,606, filed June 17, 1948.

In the pending application it was proposed to provide a magnetic brake for the fishing reel, with means operable for setting the brake in case a slack developed in the line during casting operations.

In the present invention it is proposed to provide certain improvements in the brake mechanism, in the electrical circuit associated with the brake mechanism, a tripping device for rendering the brake active in response to a slack developing in the line and in the mounting means for the battery furnishing the source of energy for the electrical circuit.

Further objects and advantages of our invention will appear as the specification proceeds, and the novel features of our invention will be fully defined in the claims attached hereto.

Figure 1:
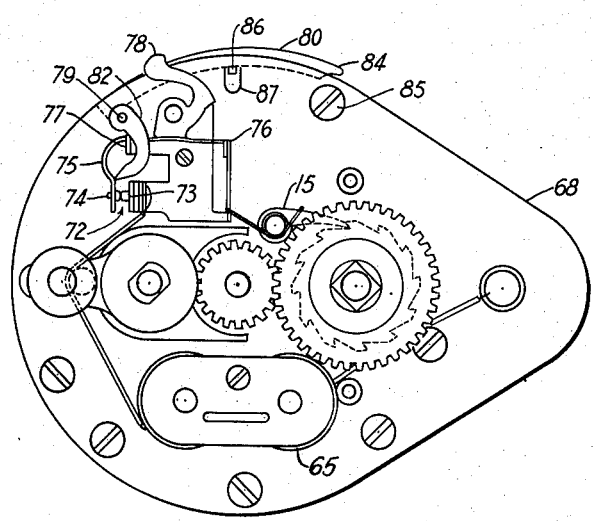
Figure 2:
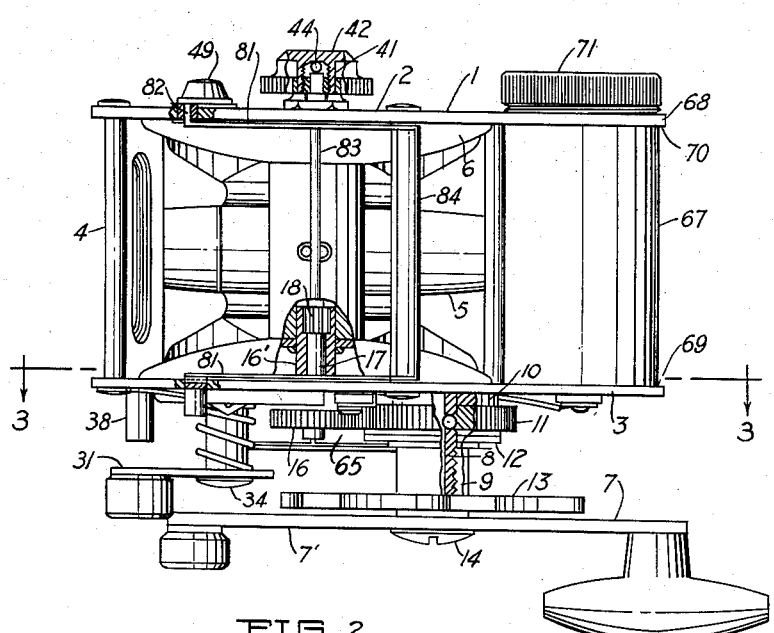

The preferred form of our invention is illustrated in the accompanying drawing, in which Figure 1 shows a side view of our fishing reel, with a cover plate removed and with certain other portions removed to more clearly disclose the features of the present invention, Figure 2, a top plan view of the reel, certain portions being shown in sections, Figure 3, an inside view of one of the end members of the reel substantially as seen from line 3—3 of Figure 2, Figure 4, an edge view of the assembly shown in Figure 3, Figure 5, a fragmentary inside view of the other end plate of the reel, and Figure 6, an exploded view in perspective of a clutch mechanism used in our invention.

While we have shown only the preferred form of our invention, we wish to have it understood that various changes and modifications may be made within the scope of the claims attached hereto without departing from the spirit of the invention.

Referring to the drawings in detail, our fishing reel comprises generally the conventional features of a frame 1 having two symmetrical end members 2 and 3, with suitable spacing members 4 for holding the same in spaced and parallel relation, and a base 5 for mounting the same upon a fishing rod, a spool 6 revolvable in the frame, and a handle 7 for revolving the spool.

The drive means for the spool comprises a post 8 rising from the outer surface of the end frame member 3, a threaded sleeve 9 revolvable on the post, a ratchet wheel 10 mounted on the sleeve against rotation, a gear wheel 11 revolvable on the sleeve, a pair of friction discs 12 non-revolvable on the sleeve, a star drag 13 threaded on the sleeve and operable for urging the friction discs upon the gear wheel and the latter upon the ratchet wheel, and the handle 7 secured upon the outer end of the sleeve by means of a screw 14. This structure is conventional and is intended to give to the gear wheel a desired amount of drag. A pawl 15 cooperates with the ratchet wheel in holding the latter against reverse movement.

The gear wheel 11 drives a pinion 16 mounted on a tube 16', which latter is slidable on one of the spindles 17 projecting from the spool 6 and may be engaged into driving relation with the latter through the clutch 18. The clutch may be disengaged by an outward movement of the pinion which is effected by means of a plate 19 (see Fig. 6) having a forked end engaging in an annular groove 20 behind the pinion, and mounted on a sleeve 21 so as to extend sidewise therefrom. The sleeve is slidable on a post 22 projecting outwardly from the face of the end member 3, and being of much greater inside diameter than the post so as to leave an annular space between the same.

The post has a ring 23 surrounding the same adjacent the face of the end member 3 and this ring has a prong 24 projecting into a slot 25 in the end mmeber for limited freedom of rotary motion. The ring also has a pair of cams 26 projecting outwardly therefrom, and its inner edge is toothed as at 27.

The plate 19 has a registering pair of concave cams 28 engageable over the cams 26 so as to allow the inner face of the plate to lie against the outer face of the ring when the cams register.

A second sleeve 29 is slidable in the space between the first sleeve 21 and the post 22 and has a toothed inner end 30 engaging in the toothed edge 27 of the ring 23. The outer end of the sleeve 29 has a crank handle 31 projecting therefrom, with an end button 32. A spring 33 surrounds the sleeve 29 and bears at one end on the crank handle 31, and at its other end on the plate 19. The crank handle is fixed to the post 22 by means of a screw 34, so that the spring urges the plate 19 upon the ring 23.

In operation, the parts herein described are normally in position to cause the cams 26 and 28 to register and cause the inner face of the plate 19 to lie flat against the outer face of the ring 23. In this position the pinion 16 meshes with the gear wheel 11 and the pinion sleeves 16' is in driving engagement with the spool spindle 17 at the clutch 18 (see Fig. 2). When the button of the crank handle 31 is turned through part of a revolution, as limited by the slot 25, the ring 23 turns with the handle, on account of the teeth 27 and 30, while the plate 19 is held against turning movement through its forked engagement behind the pinion 16. Thus the cams 26 are forced to ride against the underfaces of cams 28 and force the plate 19 outward and away from the outer face of the ring 23. This movement forces the pinion 16 outward, away from the face of the end plate 3 and disconnects the clutch engagement 18 between the pinion and the spindle 17, and makes the spool free-wheeling. The thickness of the gear wheel and of the pinion is slightly greater than the length of the clutch 18, so that the gear and pinion remain in engagement at all times.

When the clutch is in engagement, the different parts are arranged so that the crank handle 31 lies in alinement with the axes of rotation of the gear wheel 11 and the pinion 16 and points away from the latter. In this position the button 32 at the end of the handle clears the main driving handle 7 as the latter is rotated for driving the spool, the handle 7 having an extension 7'. But when the handle 31 is turned for releasing the clutch 18, it enters into the path of the extension 7', and is forced back to its original position when the handle 7 is rotated for operating the spool.

Thus the clutch 18 may be thrown out of engagement by a slight turn of the crank handle 31, to ensure free wheeling in casting operations, but as soon as the handle 7 is turned for retrieving operations, the clutch is thrown into engagement automatically by the extension 7' striking the crank handle 31 and returning it to an initial position.

The spindle 17 projects beyond the pinion 16 for a short distance and its end bears against a spring-pressed ball 36 mounted in a shield 37 secured upon the outside of the end member 3 on posts 38.

A second spindle 40 projects from the spool in the opposite direction and extends through the end member 2, which carries a bearing 41 for the spindle and a cap 42 threaded on the bearing, with a ball 44 mounted in the cap and forming an end thrust bearing for the spindle. Thus, by adjustment of the cap, the spool may be nicely adjusted between the end members 2 and 3, the balls 44 and 36 serving as end-thrust bearings.

The inner face of plate 2 carries a click arrangement in the form of a split ring 45 (see Fig. 5) mounted upon the said face, and a tooth 46 slidable radially and extending into the space between the ends of the split ring. The tooth extends from a support 47 slidable in a radial slot 48 and operable by an outside knob 49. When the support is moved inwardly, the tooth is thrown into the path of an annular series of teeth 50 on a disc 51 fixed upon the spool in concentric relation to the spindle so as to form a clicking noise when the spool rotates. When the support 47 is retracted manually, the tooth 46 is withdrawn from contact with the disc teeth and remains inactive.

The operation of the click is desirable only at the time a fish pulls on the line so as to give warning to the fisherman. In casting and retrieving operations it is not desired. We provide means, therefore, whereby the click becomes inactive upon the beginning of a retrieving operation. For this purpose we provide a notch 52 in one edge face of the tooth 46, while leaving the opposite edge of the tooth substantially flat. It will be noted, with reference to Figure 5, that when the tooth is advanced to the dotted line position and the spool disc 51 is rotated clockwise, the lower end of the spring ring will rest in the notch and will prevent the tooth 46 from retreating. If, however, the spool disc 51 is rotated in the opposite direction, the disc teeth, bearing on the inclined underface of the tooth, tend to lift the notched portion 52 away from the lower end of the ring and to urge the tooth 46 away from the disc so that after a few contacts the tooth 46 is pushed outward into inactive position.

In operation, the fisherman, before casting, will manually retract the click. After the casting is completed, he will push the click into active position. When a fish bites, it will pull on the line and cause the click to operate. When the fisherman pulls in the line, the spool rotates in the opposite direction and pushes the click back into inactive position.

The brake mechanism is illustrated in detail in Figures 3 and 4 and is mounted upon the inner face of the frame member 3. It comprises a plate 55 mounted upon said inner face with freedom of teetering motion and slotted as at 56 to straddle the central bearing structure for the spindle 17. The lower end of the plate, as viewed in Figure 3, terminates in an enlarged section 57 to serve as an armature, and the two legs, on opposite sides of the bearing structure, are indented to form alined projections 58 bearing against the inner face of the end plate, the plate being adapted to teeter on said projections. The teetering motion is limited in one direction by the armature striking the face of the end plate, and in the other direction by the upper edge 60 of the plate striking the face of the end plate 3.

The plate 55 is secured to the end plate 3 of the frame by means of two screws 61 passing through the indentations 58 and threaded into the end plate.

A brake lining 62 is carried in inclined position by a second plate 63 of light, springy material and this plate is also anchored to the screws 61 and extends in a direction opposite to that of the armature. Its anchoring end is bifurcated to straddle the bearing structure, and the legs thus formed are perforated to take the anchoring screws 61 and are disposed between the screw heads and the legs of the plate 55.

The legs of the spring plate are bent to form ridges 64 underneath the screw heads, and these ridges are slightly offset with respect to the centerline of the two screws and toward the brake lining, as shown in Figure 4, which causes the screw heads to urge the brake lining toward the end plate 3, this motion being limited by the upper edge 60 of plate 55 striking the inner face of the end frame member 3.

The armature is attracted to the end frame member 3 by means of a pair of electro-magnets 65, and the brake assembly heretofore described is arranged to cause the brake lining 62 to frictionally engage the curved side face of the spool, indicated by dotted lines 66, when the electromagnets are energized. The slight bias due to the action of the screw heads 61 on the ridges 64 causes the brake assembly to move into neutral position, as shown in Figure 4, when the electro-magnets are de-energized. The screws 61, which are threaded into the end plate 3, are preferably formed with shoulders limiting the screwing action so as to produce the exact tension required on the ridges 64.

Electric energy for the electro-magnets is furnished by one or more dry cells accommodated in a tube 67 mounted between forward extensions 68 of the end frame members. This tube may be permanently fixed upon one of the end members as at 69 and formed with a shoulder bearing against the other end member, as at 70, and a threaded portion extending through the latter member to receive the cap 71.

The brake mechanism is operated in response to a slackening in the line in casting operations, in the following manner. A switch 72 in the electrical circuit including the electro-magnets and the source of energy is mounted upon the outer face of the end frame plate 3 (see Figure 1) and includes a fixed contact 73 and a movable contact 74 carried by a spring 75 anchored as at 76 and passing over a fixed abutment 77. The spring has a substantially horizontal stretch between the abutments and is tensioned to normally close the switch. A pivoted operating member 78 cooperates with this horizontal stretch in opening the switch in one position and in allowing the switch to close in its other position. An arm 79 pivoted in the end frame member is adapted to move the movable switch 74 from switch closing to switch opening position.

This arm is operated by a tripping device 80 comprising a frame having two arcuate members 81 arranged in spaced and parallel relation and curved to substantially correspond to the marginal curve of the end frame members, prongs 82 projecting outwardly from the rear ends of the arcuate members and pivoted in the main frame members 2 and 3, a rod 83 connecting intermediate sections of the arcuate members, and a bar 84 connecting the front ends of the arcuate members. The arcuate frame thus formed is pivoted, as at 82, in the upper portion of the main frame, somewhat rearwardly of its vertical central plane and extends forwardly of said plane, the bar being made with a transversely concaved face adapted to rest on one of the spacing members identified by the numeral 85. The intermediate rod has two projecting prongs 86 adapted to play in slots 87 in the end plates of the main frame. The arm 79 is secured upon one of the prongs 82.

When the fishing reel is not in use, the switch 72 is opened by operation of the switch operating member 78. When the reel is to be used, the switch operating member 78 is swung backward to allow the switch to close, under the influence of the spring member 75, which also lifts the bar 84 away from its cooperating spacing member 85. This causes the brake to be set.

The free end of the fishing line is threaded through the space between the rod 83 and the bar 84, the latter being positioned so that in casting operations the line bears down on the bar and, through the arm 79, opens the switch so that the spool is free to revolve during the casting operation, as long as the line is taut. If the line slackens during or at the end of the casting operation, the tension on the bar 84 ceases and the spring member 75 of the switch urges the arm 79 forward, closing the switch at the same time. This closes the circuit of the electro-magnets and sets the brake.

We claim:
1. A trip member for a fishing reel, comprising a pair of arcuate members arranged in parallel relation, a rod connecting the same intermediate their lengths and having prongs projecting beyond the members, a bar connecting the members at corresponding ends thereof and being concave in cross-section, and prongs projecting outwardly from the opposite ends thereof.

2. In combination, in a fishing reel, a frame comprising a pair of spaced end members having corresponding circular marginal sections, with a spacing member connecting the said sections, slots rearwardly of said spacing member and bearings rearwardly of the slots, and a trip member having a pair of arcuate members substantially paralleling the marginal sections, a rod connecting the arcuate members intermediate their lengths and having projecting prongs adapted to play in said slots, a bar connecting corresponding ends of the arcuate members and concave in cross-section for seating on the spacing member and prongs projecting from the opposite ends of the arcuate members and seated in the bearings.

3. In combination, in a fishing reel, a frame comprising a pair of spaced end members having corresponding circular marginal sections, with a spacing member connecting the said sections, slots rearwardly of said spacing member and bearings rearwardly of the slots, and a trip member having a pair of arcuate members substantially paralleling the marginal sections, a rod connecting the arcuate members intermediate their lengths and having projecting prongs adapted to play in said slots, a bar connecting corresponding ends of the arcuate members and concave in cross-section for seating on the spacing member and prongs projecting from the opposite ends of the arcuate members and seated in the bearings, one of the latter prongs having a switch-operating arm projecting therefrom.

4. In a fishing reel, a frame comprising a pair of end members, a spool revolvably mounted between the end members, a bearing for the spool in one of the end members, a lever pivoted to the said end member on opposite sides of the bearing, and having a brake lining upon one end thereof for braking contact with the spool and having an armature at the other end, and an electro-magnet mounted upon said one end member opposite the armature so as to attract the litter and to force the brake lining upon the spool when the electro-magnet is energized.

5. In a fishing reel, a frame comprising a pair of end members, a spool revolvably mounted between the end members, a bearing for the spool in one of the end members, a lever pivoted to the said end member on opposite sides of the bearing, and having a brake lining upon one end thereof for braking contact with the spool and having an armature at the other end, and an electro-magnet mounted upon said one end member opposite the armature so as to attract the latter and to force the brake lining upon the spool when the electro-magnet is energized, the lever pivots including means for urging the brake lining away from the spool.

6. In a fishing reel, a frame comprising a pair of end members, a spool revolvably mounted between the end members, a bearing for the spool in one of the end members, a lever pivoted to the said end member on opposite sides of the bearing, and having a brake lining upon one end thereof for braking contact with the spool and having an armature at the other end, and an electro-magnet mounted upon said one end member opposite the armature so as to attract the latter and to force the brake lining upon the spool when the electro-magnet is energized, the lever pivots including means for urging the brake lining away from the spool, and the lever having means cooperable with the said end member in limiting movement of said lining away from the spool.

7. In a fishing reel, a frame comprising a pair of end members, a spool revolvably mounted between the end members, a bearing for the spool in one of the end members, a lever pivoted to the said end member on opposite sides of the bearing, and having a brake lining upon one end thereof for braking contact with the spool and having an armature at the other end, and an electro-magnet mounted upon said one end member opposite the armature so as to attract the latter and to force the brake lining upon the spool when the electro-magnet is energized; the lever comprising a plate having the armature at one end and having legs straddling the bearing at its other end, with indentations in the legs bearing against the end member, a spring plate having the brake lining at one end and having legs straddling the bearing and superimposed on the legs of the first plate, and screws passing through the assembled legs into the end member at the indentations to secure the legs of the second plate upon those of the first plate and the legs of both plates upon the end member with freedom of teetering motion.

8. In a fishing reel, a frame comprising a pair of end members, a spool revolvably mounted between the end members, a bearing for the spool in one of the end members, a lever pivoted to the said end member on opposite sides of the bearing, and having a brake lining upon one end thereof for braking contact with the spool and having an armature at the other end, and an electro-magnet mounted upon said one end member opposite the armature so as to attract the latter and to force the brake lining upon the spool when the electro-magnet is energized; the lever comprising a plate having the armature at one end and having legs straddling the bearing at its other end, with indentations in the legs bearing against the end member, a spring plate having the brake lining at one end and having legs straddling the bearing and superimposed on the legs of the first plate, and screws passing through the assembled legs into the end member at the indentations to secure the legs of the second plate upon those of the first plate and the legs of both plates upon the end member with freedom of teetering motion, and the legs of the second plate being bent to form ridges underneath the screw heads and slightly offset with respect thereto toward the lining for normally biasing the lining away from the spool.

EDWARD J. PERINONI.
DOMINIC PERINONI.

REFERENCES CITED

The following references are of record in the file of this patent:

UNITED STATES PATENTS

| Number | Name | Date |
| --- | --- | --- |
| 422,786 | Holzman | Mar. 4, 1890 |
| 595,110 | Meisselbach et al. | Dec. 7, 1897 |
| 996,348 | Kramer | June 27, 1911 |
| 1,047,993 | Schmid | Dec. 24, 1912 |
| 1,462,716 | Masin | July 24, 1923 |
| 1,509,324 | Tobey | Sept. 23, 1924 |
| 1,547,297 | Case | July 28, 1925 |
| 1,639,629 | Case | Aug. 16, 1927 |
| 1,765,903 | Case | June 24, 1930 |
| 1,974,333 | Hirsch | Sept. 18, 1934 |
| 2,145,929 | Herman | Feb. 7, 1939 |

FOREIGN PATENTS

| Number | Country | Date |
| --- | --- | --- |
| 122,221 | Sweden | July 13, 1948 |